(12) United States Patent
Honma

(10) Patent No.: US 6,480,230 B1
(45) Date of Patent: Nov. 12, 2002

(54) IMAGE PROCESSING OF VIDEO SIGNAL FOR DISPLAY

(75) Inventor: Yoshihiro Honma, Asaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/262,929

(22) Filed: Mar. 5, 1999

(30) Foreign Application Priority Data

Mar. 6, 1998 (JP) .......................................... 10-071203

(51) Int. Cl.[7] ................................................. H04N 7/01
(52) U.S. Cl. ....................... 348/443; 348/441; 348/445; 348/452; 348/715; 348/222; 382/300; 345/603
(58) Field of Search ................................. 348/443, 441, 348/445, 454, 446, 564, 448, 452, 552, 555, 222, 715; 345/603; 382/300; H04N 7/01

(56) References Cited

U.S. PATENT DOCUMENTS

| | | | | |
|---|---|---|---|---|
| 5,459,520 A | * | 10/1995 | Sasaki | 348/445 |
| 5,541,651 A | * | 7/1996 | Iura et al. | 348/240 |
| 6,097,437 A | * | 8/2000 | Hwang | 348/441 |
| 6,118,486 A | * | 9/2000 | Reitmeier | 348/441 |
| 6,130,711 A | * | 10/2000 | Fukushima | 348/231 |
| 6,144,411 A | * | 11/2000 | Kobayashi et al. | 348/441 |
| 6,144,412 A | * | 11/2000 | Hirano et al. | 348/441 |
| 6,256,068 B1 | * | 7/2001 | Takada et al. | 348/441 |

* cited by examiner

Primary Examiner—John Miller
Assistant Examiner—Jean W. Désir
(74) Attorney, Agent, or Firm—Fitzpatrick, Cella, Harper & Scinto

(57) ABSTRACT

A video signal processing apparatus which can perform a liquid crystal display without a deterioration of a picture quality even when a CCD sensor of the NTSC system is used at the time of the PAL system is provided. The video signal processing apparatus has a 1H delay circuit and a selecting circuit. Upon PAL system, by switching the selecting circuit once every seven lines and performing a pre-interpolation, the lines are compensated from 485 lines (vertical) of the NTSC system to 575 lines (vertical) of the PAL system. In case of performing the liquid crystal display, the timing of an interpolation (LCOMP) signal is synchronized with the timing of the EN signal upon PAL system so as to coincide the portion of the lines to be compensated from 485 lines (vertical) of the NTSC system to 575 lines (vertical) of the PAL system with the portion to be thinned out at a rate of 1 line per 7 lines in the liquid crystal display. Thus, even if the CCD sensor of the NTSC system is used upon PAL system, the liquid crystal display panel can display an image without deterioration of a picture quality.

3 Claims, 8 Drawing Sheets

IMAGE PROCESSING OF VIDEO SIGNAL FOR DISPLAY

BACKGROUND OF THE INVENTION

1. Field of the Invention

The invention relates to video signal processing apparatus and method for processing a video signal which is displayed in a video output apparatus such as television (TV) monitor, liquid crystal display panel, or the like.

2. Related Background Art

FIG. 9 is a block diagram showing a construction of a conventional video signal processing apparatus. In the diagram, reference numeral 101 denotes a CCD sensor for converting a received video image into an electric signal; and 102 indicates a photo taking system signal processing circuit. The photo taking system signal processing circuit 102 forms a luminance signal by performing a color carrier removal, an aperture compensation, a gamma process, and the like to the video signal that is outputted from the CCD sensor 101 and, at the same time, forms color difference signals by performing a color interpolation, a matrix conversion, a gamma process, a gain adjustment, and the like to the video signal, and generates a video signal of YUV or the like.

Reference numeral 103 denotes a TV system signal processing circuit for generating a TV signal by performing processes such as chroma encoding process, band compensation, composite signal formation, and the like to the YUV signal that is generated from the photo taking system signal processing circuit 102. Reference numeral 104 denotes an LCD controller for generating a drive pulse necessary for an LCD display and converting the TV signal that is generated from the TV system signal processing circuit 103 into an RGB signal to be displayed on an LCD panel 105. Reference numeral 105 denotes the LCD panel for displaying the RGB signal that is outputted from the LCD controller 104 by an LCD device as a visible image.

Reference numeral 106 denotes a TV monitor for displaying a video image in accordance with each TV system such as NTSC system, PAL system, or the like. In the NTSC system and the PAL system, the numbers of pixels of the CCD sensors which are necessary differ. For example, in the NTSC system, the number of pixels is equal to 752 (in the horizontal direction)×485 (in the vertical direction). In the PAL system, the number of pixels is equal to 736 (horizontal)×575 (vertical). The number of pixels of the LCD panel which is used in a photo taking apparatus such as cam coder, digital camera, or the like characterized by portability is, hitherto, so small to be 279 (horizontal)×220 (vertical).

Although an LCD panel having the large number of pixels has been developed in recent years, the number of pixels is equal to up to 550 (horizontal)×220 (vertical) and is equal to ½ of that of the CCD sensor of the NTSC system. Hitherto, in case of providing an apparatus which can cope with both of the NTSC system and the PAL system using the CCD sensor (752 (horizontal)×485 (vertical)) for the NTSC system, in case of using the PAL system, 575 lines in the vertical direction are formed by compensating the insufficient lines from 485 lines in the vertical direction.

In case of displaying on an LCD panel of the small number of pixels comprising 550 (horizontal)×220 (vertical) pixels or the like, although the lines of the number of almost one field can be displayed in the NTSC system, the image data of 1/7 line of the field cannot be displayed in the PAL system. In case of displaying the video signal of the PAL system onto the LCD panel, seven lines are thinned out by one line and the reduced video image is displayed. Such a thinning process of the lines is performed by an LCD controller designed so as to drive the LCD panel.

On the other hand, in case of outputting the video signal of the PAL system by using the CCD sensor having the number of lines according to the NTSC system, the insufficient lines are compensated by an interpolation or the like. However, when the LCD controller displays the supplied video signal of the PAL system to the LCD panel as mentioned above, the video signal is thinned out and displayed.

In case of displaying the video signal onto the LCD panel by the PAL system, consequently, a phenomenon such that the original video signal is thinned out or the like occurs and a quality of the image displayed on the LCD panel is remarkably deteriorated.

Particularly, in case of super-imposing character information or the like for a user interface onto a video image and displaying the super-imposed video image, since the character information is thinned out at the time of the LCD display of the PAL system, fine lateral lines of the characters are deleted and the function to correctly display information is deteriorated. FIGS. 10A to 10D are diagrams showing an example of a display in which a part of the character has been deleted.

Although the characters of "ERASE" are displayed in the TV monitor 106 (FIG. 10A), the character of "E" that should inherently be shown in FIG. 10B is thinned out and is not correctly displayed on the LCD panel 105. As mentioned above, the character of "E" is seen like "C" as shown in FIG. 10C or is seen like "F" as shown in FIG. 10D, so that the character information cannot be correctly displayed.

The above problem occurs because of the use of the liquid crystal display for converting the output of the CCD sensor having the number of lines for the NTSC system into the TV signal for the PAL system and displaying an image.

Hitherto, a digital camera apparatus which can easily switch an external video output according to the NTSC system and an external video output according to the PAL system is not known yet.

SUMMARY OF THE INVENTION

It is an object of the invention to provide image processing apparatus and method which can solve each of or all of the foregoing problems.

Under such an object, another object of the invention is to reduce the deterioration of a quality of an image that is displayed on a display.

Still another object of the invention is to reduce the deterioration of a quality of an image that is displayed when the image is displayed by using a general liquid crystal display.

Further another object of the invention is to provide video signal processing apparatus and method which can perform a liquid crystal display without a deterioration of a picture quality even by using a CCD sensor of the NTSC system when an output of the PAL system is generated.

To accomplish the above objects, according to a first aspect of a preferred embodiment of the invention, there is provided a video signal processing apparatus comprising; storage means for storing video data; read-out means for reading out the stored video data; interpolating means for interpolating the read-out video data; display means for displaying the interpolated video data; and interpolation control means for matching the data in the portion that is interpolated by the interpolating means to the data in a portion that is not displayed by the display means when the video data is displayed.

Further another object of the invention is not to deteriorate a display quality of data which is super-imposed and displayed together with an image.

Under the above object, in the video signal processing apparatus according to the first aspect of the invention, the storage means stores the video data comprising photographed image data and video data for super-impose; the read-out means individually reads out the stored photographed image data and video data for super-impose; the interpolating means interpolates the photographed image data and the video data for super-impose which are individually read out; the display means displays the interpolated photographed image data and video data for super-impose onto a same picture plane; and the interpolation control means matches the photographed image data and video data for super-impose in the portions which are interpolated by the interpolating means to the data in the portion that is not displayed by the display means, respectively.

Further another object of the invention is to reduce a deterioration of a picture quality when an output of an image pickup device having the pixels of the number larger than the number of pixels that is required by a standard television system is displayed as an image by using a display having the display pixels of the number smaller than the number of pixels that is required by the standard TV system.

Further another object of the invention is to provide a digital camera apparatus which can easily cope with various standard television systems.

Further another object of the invention is to reduce a deterioration of a quality of an image that is displayed on a display of a digital camera.

The above and other objects and features of the present invention will become apparent from the following detailed description and the appended claims with reference to the accompanying drawings.

DETAILED DESCRIPTION OF THE PREFERRED EMBODIMENTS

An embodiment of video signal processing apparatus and method of the invention will now be described. The video signal processing apparatus of the embodiment is applied to an image pickup apparatus such as a digital camera or the like.

[First embodiment]

Figure 1:
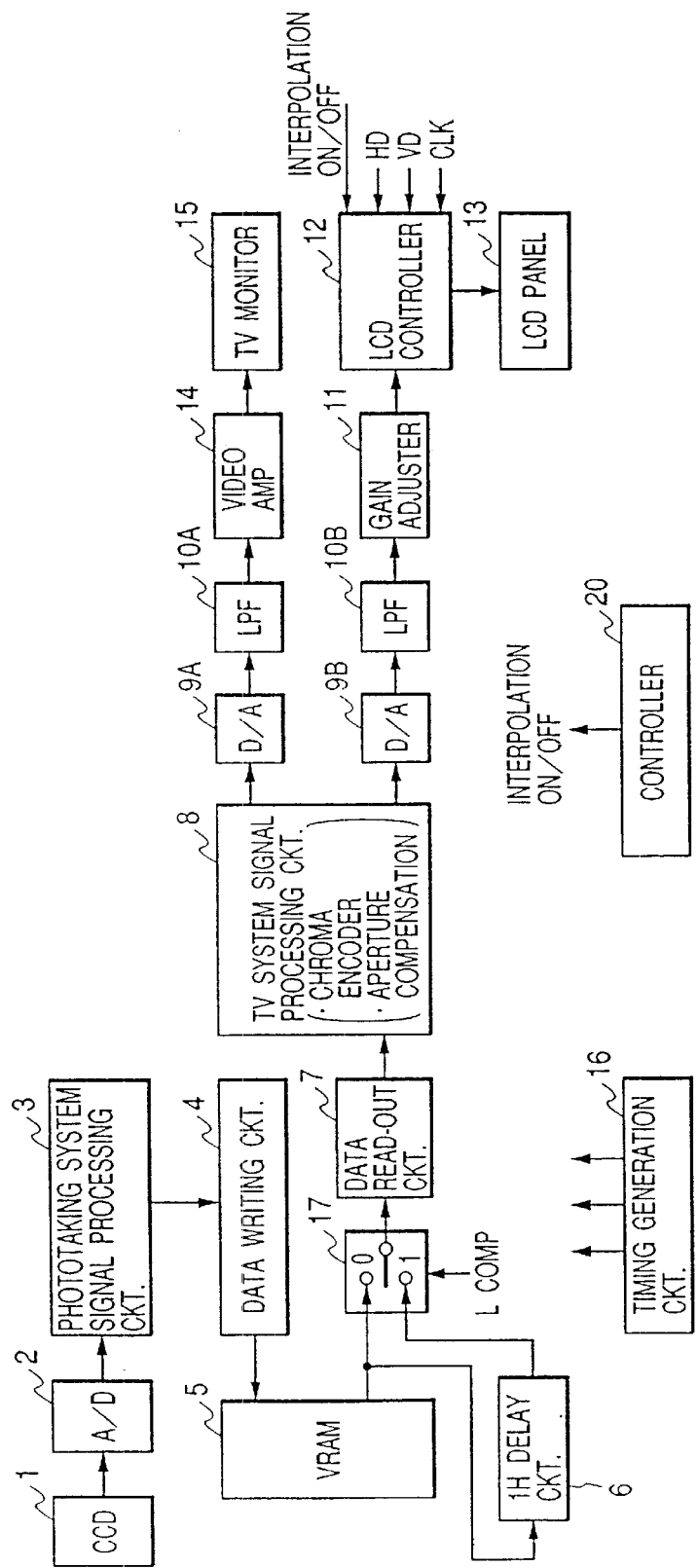
FIG. 1 is a block diagram showing a construction of a video signal processing apparatus in the first embodiment of the invention.

FIG. 1 is a block diagram showing a construction of the video signal processing apparatus in the first embodiment. In the diagram, reference numeral 1 denotes a CCD sensor for converting a received video image into an electric signal. In the embodiment, the CCD sensor has pixels of the number larger than the number of pixels that is required by the NTSC system or the PAL system. Reference numeral 2 denotes an A/D converter for converting an analog video signal that is outputted from the CCD sensor 1 into a digital video signal.

Reference numeral 3 denotes a photo taking system signal processing circuit. The photo taking system signal processing circuit 3 forms a luminance signal by performing a color carrier removal, an aperture compensation, a gamma process, and the like from an output signal of the CCD sensor 1 and, at the same time, forms color difference signals by performing a color interpolation, a matrix conversion, a gamma process, a gain adjustment, and the like, and outputs a video signal of YUV or the like. Reference numeral 4 denotes a data writing circuit for writing the video signal after completion of the signal processes into a VRAM 5.

The VRAM (volatile memory) 5 is a memory for video in which ports for writing and reading out are provided for, for example, a dynamic RAM (DRAM) and which performs an addressing every horizontal line.

Reference numeral 6 denotes a 1H delay circuit. By holding data of one horizontal line (H), the 1H delay circuit 6 is used for pre-interpolation or the like of every horizontal line.

Reference numeral 7 denotes a data read-out circuit to read out the video data stored in the VRAM 5.

Figure 2:
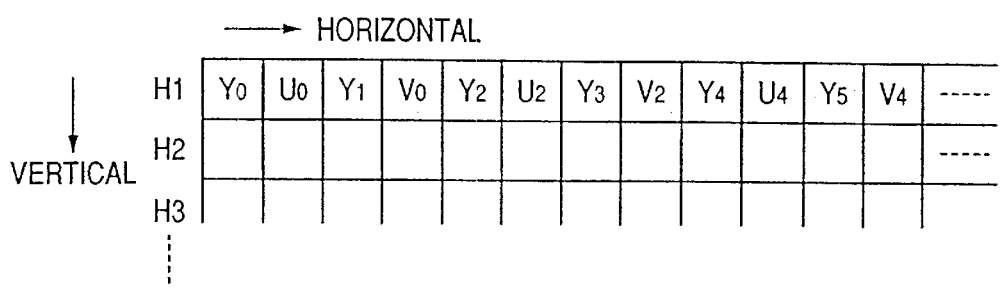
FIG. 2 is a diagram showing an array of video data.

FIG. 2 is a diagram showing an array of the video data. The data is stored into continuous memory addresses in the VRAM 5 every horizontal line by the data writing circuit 4 in a manner such as YUYV . . . The data is read out every horizontal line by the data read-out circuit 7 in accordance with an address pointer and a data size in a manner such as H1, H2, . . . .

Reference numeral 8 denotes a TV system signal processing circuit for performing signal processes such as chroma encoding process, band compensation, composite signal formation, and the like to the video signal of YUV read out by the data read-out circuit 7 and outputting a digital video signal for TV.

Reference numerals 9A and 9B denote D/A converters for converting the digital video signal into the analog video signal; 10A and 10B low pass filters (LPFs) for cutting high frequency noise components upon D/A conversion; and 11 a gain adjustment circuit to adjust the video signal transmitted through the LPF 10B to the signal at the level suitable for liquid crystal display.

Reference numeral 12 denotes an LCD controller for generating a drive pulse necessary for the liquid crystal display and converting the TV signal from the gain adjustment circuit 11 into the signal for the liquid crystal display; and 13 indicates an LCD panel for displaying the signal from the LCD controller 12 as a visible video image by a liquid crystal device.

When a video signal according to the given PAL system is given to the LCD controller 12 in the embodiment, the LCD controller thins out the interlaced image signals of the odd fields and even fields as will be explained hereinlater and, thereafter, displays an image of the thinned image signals onto the LCD device. Upon such a displaying, the lines of the interlaced image signals are thinned out and an image corresponding to the thinned signals is displayed as it is.

Reference numeral 14 denotes a video amplifier for outputting the video signal transmitted through the LPF 10A at a signal level and an output impedance for TV; 15 a TV monitor for displaying a video image in accordance with the TV system such as NTSC system, PAL system, or the like; 16 a timing generation circuit for generating a timing signal necessary for each circuit; and 17 a selecting circuit for switching the output of the VRAM 5 and the output of the 1H delay circuit 6 as necessary and performing a pre-interpolation.

The operation of the video signal processing apparatus having the above construction will now be described. The video signal received by the CCD sensor 1 is converted into the digital video signal by the A/D converter 2 and is processed to the video signal of the YUV format by the photo taking system signal processing circuit 3. Y denotes a luminance signal after completion of the processes such as color carrier removal, aperture compensation, gamma conversion, and the like. U and V denote a color difference signal of (B−Y) and a color difference signal of (R−Y) respectively, and these signals are formed by performing the processes such as color interpolation, matrix conversion, gamma conversion, and the like. The video signals of Y, U, and V which are generated from the photo taking system signal processing circuit 3 are sequentially stored into the VRAM 5 by the data writing circuit 4 in a manner such as YUYVYUYV . . . from the upper left position on the screen as shown in, for example, a data array of FIG. 2.

The data stored in the VRAM 5 is sequentially read out by the data read-out circuit 7 in accordance with the writing order and is processed to luminance and chroma separation signals, a composite signal, and luminance and color difference signals for liquid crystal by the TV system signal processing circuit 8.

The digital video signals outputted from the TV system signal processing circuit 8 are converted into the analog video signals by the D/A converters 9A and 9B, are band-limited by the LPFs 10A and 10B, are level-matched by the gain adjustment circuit 11, and the resultant video signals are outputted to the LCD controller 12. The level matching and the output impedance adjustment are performed by the video amplifier 14 and the resultant signals are outputted to the TV monitor 15.

As mentioned above, the numbers of pixels of the CCD sensors which are necessary in the NTSC system and the PAL system differ. For example, in the NTSC system, the number of pixels is equal to 752 (in the horizontal direction)×485 (in the vertical direction). In the PAL system, the number of pixels is equal to 736 (horizontal)×575 (vertical). The number of pixels of the LCD panel even having the large number of pixels is equal to 550 (horizontal)×220 (vertical) and is equal to about ½ of that of the CCD sensor of the NTSC system.

Therefore, even in the cam coder or digital camera corresponding to the PAL system, in the operation of an EVF (electronic view finder), rec review, or the like, particularly, when importance is made to only the liquid crystal display, the number of pixels of the NTSC system is sufficient. Therefore, it is examined to develop a system corresponding to both of an external output of the NTSC system and an external output of the PAL system by using the CCD sensor or video buffer (VRAM) of the NTSC system at low costs, An apparatus which can cope with the external output of the NTSC system and the external output of the PAL system by using an image pickup device having the pixels of the number larger than that of the NTSC system or the PAL system is demanded.

In this case, upon PAL system, the lines have to be compensated at a rate of one line per seven lines. That is, it is necessary to compensate the lines from 485 lines (vertical) of the NTSC system to 575 lines (vertical) of the PAL system by switching the selecting circuit 17 once seven lines and performing the pre-interpolation.

In case of the liquid crystal display, on the other hand, in the embodiment, the signal after compensating the lines to 575 lines (vertical) of the PAL system is supplied to the LCD controller 12. In such a case, the pixels which can be displayed are the pixels of 550 (horizontal)×220 (vertical) and the number of horizontal lines, in other words, the number of pixels in the vertical direction is almost equal to the number of lines of one field of the NTSC system. Therefore, when the signal of the PAL system is supplied to the LCD controller 12, the lines are originally thinned out at a rate of one line per seven lines and the thinned signal is supplied to the LCD panel 13.

In the embodiment, a portion of the lines to be compensated from 485 lines (vertical) of the NTSC system to 575 lines (vertical) of the PAL system and a portion where the lines are thinned out at a rate of 1 line per 7 lines in the liquid crystal display are matched. Consequently, even if the CCD sensor of the NTSC system is used at the time of the PAL system, in the liquid crystal display, the image can be displayed without a deterioration in picture quality and without largely losing an information amount of the output of the CCD sensor of the NTSC system. The line thinning-out process in the line interpolation and the liquid crystal display and its timing will now be described hereinbelow.

Figure 3:
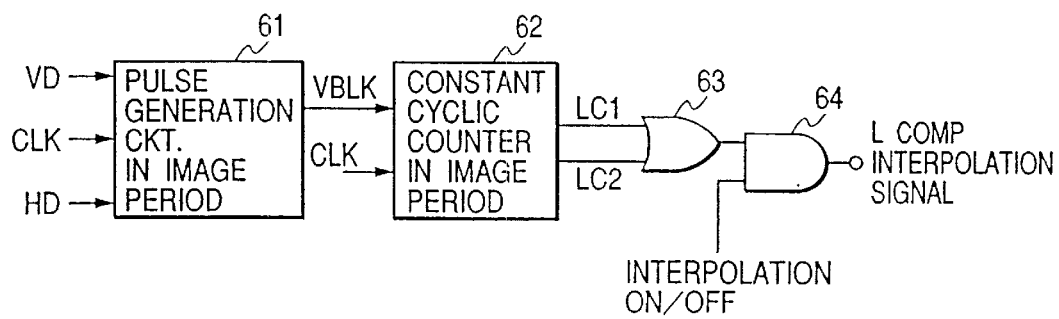
FIG. 3 is a block diagram showing a construction of a circuit to generate an interpolation (LCOMP) signal.

FIG. 3 is a block diagram showing a construction of a circuit to generate the interpolation (LCOMP) signal. In the diagram, a VD signal is a vertical sync signal, an HD signal is a horizontal sync signal, and a CLK signal is a clock signal for timing generation. A VBLK signal is a signal which is set to the H level during a video period of time and is set to the L level for a vertical blanking period of time. An LC1 signal is a first signal for interpolation; an LC2 signal is a second signal for interpolation; and the LCOMP signal is the interpolation signal which is set to the OR of the LC1 signal and the LC2 signal when an interpolation ON/OFF signal is ON.

Reference numeral 61 denotes a pulse generation circuit in an image period for receiving the VD signal, HD signal, and CLK signal and generating the VBLK signal; 62 a constant cyclic counter in an image period for receiving the VBLK signal and the CLK signal and generating the LC1 signal and the LC2 signal by using a counter and a comparator for a period of time during which the VBLK signal is at the H level; 63 an OR circuit for outputting a signal corresponding to the OR of the LC1 signal and the LC2 signal; and 64 an AND circuit for outputting the output signal of the OR circuit 63 as an LCOMP signal when the interpolation ON/OFF signal is ON. The interpolation ON/OFF signal is set to ON (H level) in case of outputting the image signal of the PAL system and is set to OFF (L level) in case of outputting the image signal of the NTSC system.

Figures 4A, 4B, 4C:
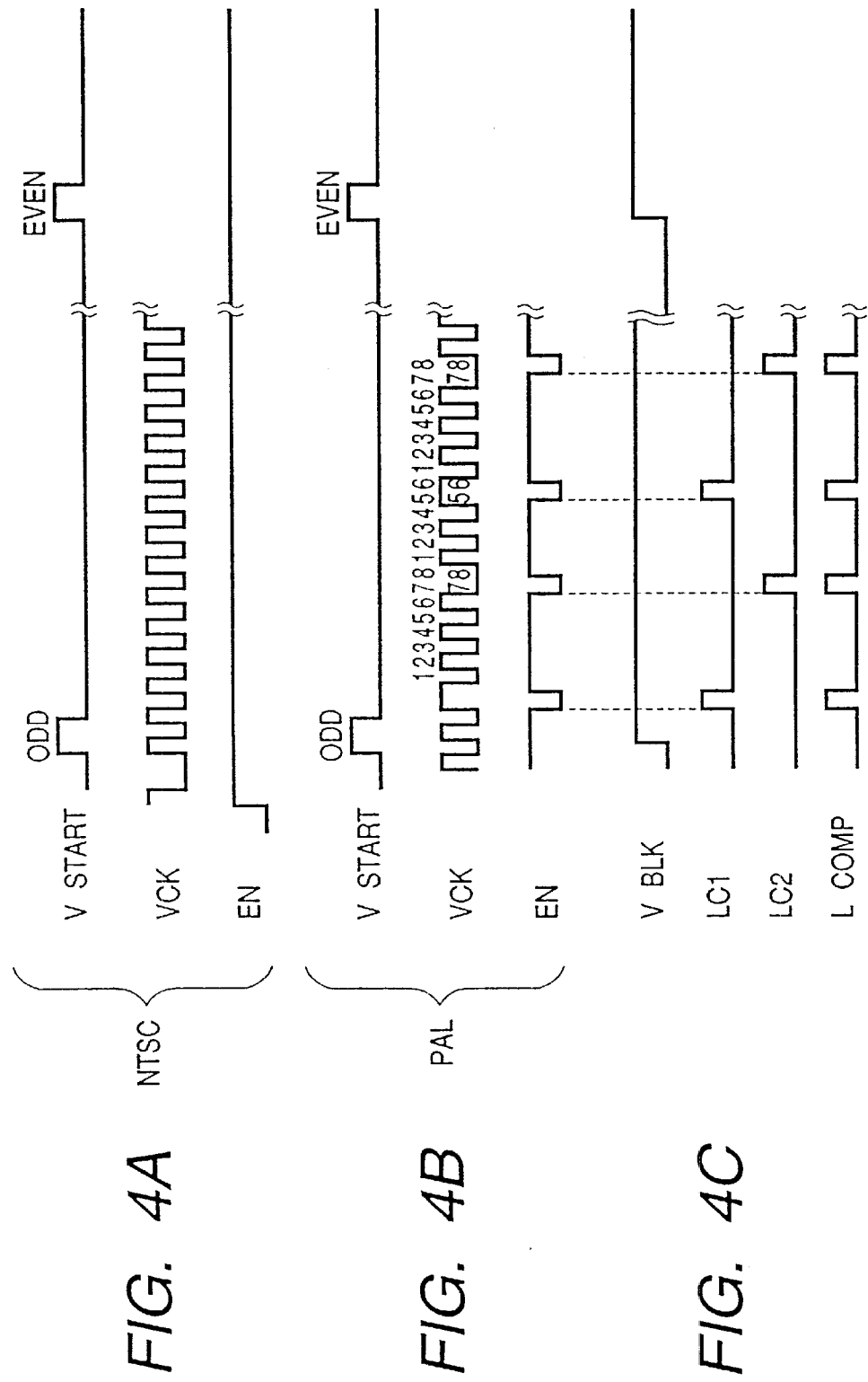
FIGS. 4A, 4B and 4C are timing charts-showing a change in each signal.

FIGS. 4A to 4C are timing charts showing a change in each signal. A VSTART signal, a VCK signal, and an EN signal are signals to drive the LCD panel 13 and are generated from the LCD controller 12 and supplied to the LCD panel 13. The interpolation ON/OFF signal, namely, a signal indicating whether the image signal of the PAL system or the image signal of the NTSC system is inputted is preset in the LCD controller 12. As shown in the diagram, the VD, RD, and CLK signals can be also inputted or the signals corresponding to the HD, VD, and CLK signals can be also extracted from the analog video signal that is inputted from the gain adjustment circuit 11.

The VSTART signal is a signal showing the start of the vertical direction in the liquid crystal display. The VCK signal is a clock showing the switching of the horizontal lines of the liquid crystal display. The EN signal is a signal showing the position where the horizontal lines are thinned out.

FIG. 4A shows a case where the LCD panel is driven at a signal timing of the NTSC system. FIG. 4B shows a case where the LCD panel is driven at a signal timing of the PAL system. As will be understood from those timings, the lines are not thinned out at the time of the NTSC system and the lines are thinned out at a rate of 2 lines per 14 lines at the time of the PAL system. Moreover, the thinning-out process of the rate of 1 line per 8 lines and the thinning-out process of the rate of 1 lines per 6 lines are alternately performed. FIG. 4C shows signals generated in FIG. 3. As mentioned above, by synchronizing the timing of the interpolation (LCOMP) signal with the timing of the EN signal at the time of the PAL system, even if the CCD sensor of the NTSC system is used at the time of the PAL system, the LCD panel can display the image without a deterioration of the picture quality.

In the embodiment, the generation timings of the LC1 and LC2 signals of the counter 62 are set so as to match the timing of the interpolation (LCOMP) signal to the timing of the EN signal of the PAL system. That is, the timing of the EN signal which is generated by the LCD controller 12 is preliminarily examined and the counter 62 is set on the basis of the EN signal.

By enabling the setting of the constant cyclic counter 62 in an image period and the setting of the internal comparator to be changed by a register or the likes the line interpolation can be performed at the position corresponding to each of the various thinning positions of the driving by the LCD controller 12.

Further, when the timing setting is made variable, the matching of the timings can be individually performed to the LCD panels by a number of manufacturers. In this case, by providing an ON/OFF switch for the 1H delay circuit 6 and supplying the signal at the L level to the selecting circuit 17 when the ON/OFF switch is OFF, the timings can be confirmed on the screen of the LCD. That is, when the line interpolation is performed, if the line becomes a black lateral line on the screen and this black line cannot be seen on the LCD screen, this means that the timings coincide, so that the timing matching can be easily confirmed.

To simplify the system construction, it is also possible to read out the same line in the VRAM 5 twice upon reading from the VRAM 5 by omitting the 1H delay circuit 6.

Further, the data writing circuit 4 and data reading circuit 7 can also perform the reading/writing operations by a DMA (direct memory access) transfer in place of performing the reading/writing operations on the basis of the addresses for the memory.

[Second embodiment]

Figure 5:
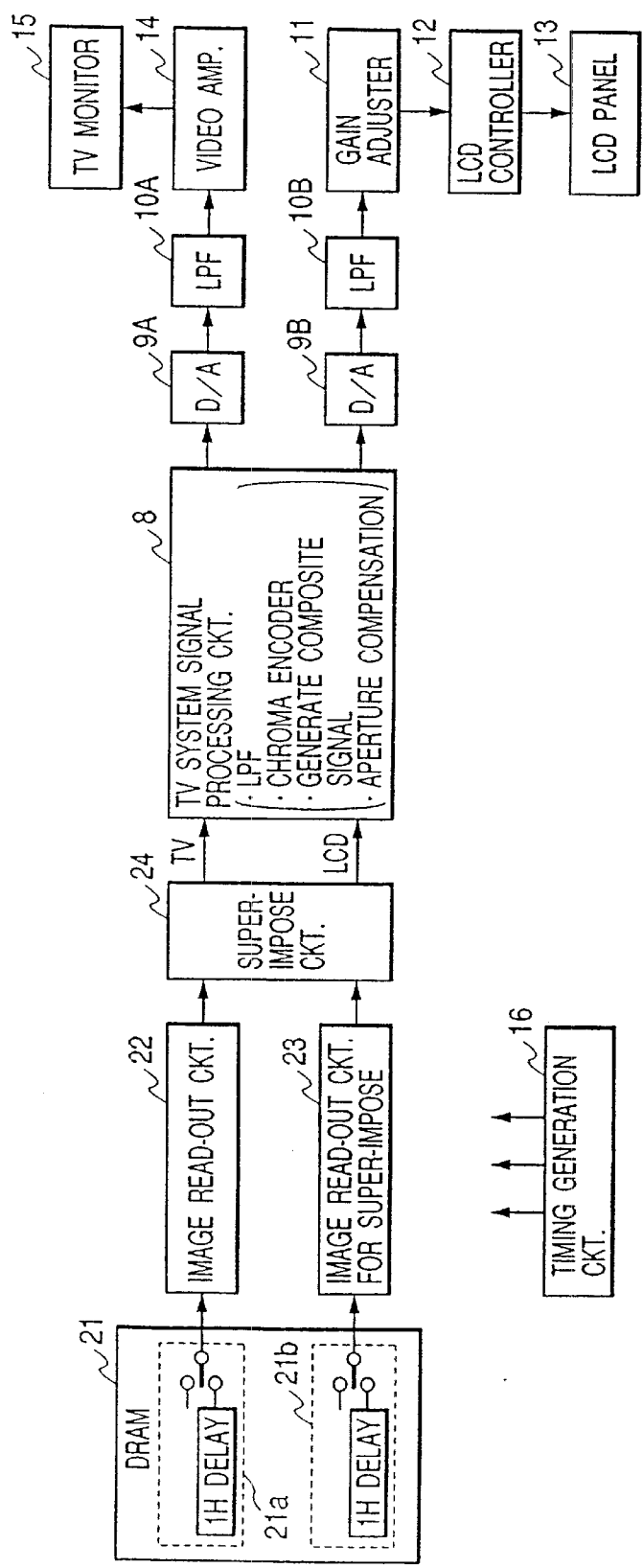
FIG. 5 is a block diagram showing a construction of a video signal processing apparatus according to the second embodiment.

FIG. 5 is a block diagram showing a construction of a video signal processing apparatus according to the second embodiment. The same circuit blocks as those in the video signal processing apparatus of the first embodiment mentioned above are designated by the same reference numerals and their descriptions are omitted here. In the diagram, reference numeral 21 denotes a DRAM which is used for the same application as that of the VRAM 5 mentioned above. Video data for super-impose that is displayed on the screen of a TV monitor or the like has been stored in the DRAM 21 in a state where it has been super-imposed onto or replaced by the photographed image received by the CCD sensor. Although not shown, a controller (apparatus control unit) 20 is provided in a manner similar to the case of FIG. 1. The same shall also similarly apply to the third and subsequent embodiments.

Reference numeral 22 denotes an image read-out circuit for reading out the data of the photographed image received by the CCD sensor; 23 an image read-out circuit for super-impose to read out the video data for super-impose stored in the DRAM 21; and 24 a super-imposing circuit for switching, super-imposing, or replacing the data of the photographed image that is generated from the image read-out circuit 22 and the video data for super-impose that is generated from the image read-out circuit 23 for super-impose and outputting resultant data. Since a construction in a range from the TV system signal processing circuit 8 to the TV monitor 15 is similar to that in case of the first embodiment mentioned above, its description is omitted.

In place of the foregoing 1H delay circuit 6, a line interpolation circuit to read out the same line twice upon line interpolation is provided for the DRAM 21. It can be realized by, for example, a process to perform the DMA transfer or the like without advancing a line address pointer upon reading. In the DRAM 21, line interpolation circuits 21a and 21b are separately provided for the image read-out circuit 22 and image read-out circuit 23 for super-impose, respectively.

The super-imposing circuit 24 switches, superimposes, or replaces the data of the photographed image from the image read-out circuit 22 and the video data for super-impose from the image read-out circuit 23 for super-impose and generates resultant data. This output signal is supplied to the TV system signal processing circuit 8.

The TV system signal processing circuit 8 processes the output signal from the super-imposing circuit 24 to luminance and chroma separation signals, a composite signal, and luminance and color difference signals for liquid crystal. The digital video signals which are outputted from the TV system signal processing circuit 8 are converted into analog video signals by the D/A converters 9A and 9B, are band-limited by the LPFs 10A and 10B, are level-matched by the gain adjustment circuit 11, and are outputted to the LCD controller 12. The digital video signals are also level-matched by the video amplifier 14 and are output impedance adjusted, and are outputted to the TV monitor 15.

A feature of the video signal output apparatus of the second embodiment will now be described. In case of outputting the video signal according to the PAL system by using the CCD sensor of the NTSC system, it is necessary to compensate the video signal at a rate of 1 line per 7 lines in a manner similar to the first embodiment. In this case, as video data for super-impose, if the capacity of the DRAM 21 is sufficient, by preparing the data corresponding to the PAL system (736 (horizontal)×575 (vertical) pixels), the video image can be outputted to the TV monitor 15 without performing the foregoing line interpolation.

However, since all of the pixel data cannot be displayed in case of performing the liquid crystal display, there is no need to have the data corresponding to the PAL system (736 (horizontal)×575 (vertical) pixels). In other words, when the user wants to match the display of the video data for superimpose on the LCD panel with that on the TV monitor, it is also necessary to line-interpolate the video image for super-impose in a manner similar to the photographed image.

In the case where character information or the like as a user interface (UI) is displayed to only the LCD panel by using the video data for super-impose, it is better not to have the data of the lines to be thinned out.

In the case where character information or the like as a user interface (VI) is displayed to the TV monitor by using the video data for super-impose mentioned above, it is better to prepare the data corresponding to the PAL system (736 (horizontal)×575 (vertical) pixels) and to display finer character information or the like. In the case, since the lines are thinned out in the liquid crystal display, it is necessary to enable the super-imposing images to be individually displayed on the TV monitor and the LCD panel by a method such that only the photographed image is displayed on the LCD panel or the like.

According to the second embodiment as mentioned above, the photographed image and the video image for super-impose can be individually line-interpolated and the display suitable for the display apparatus can be performed.

[Third embodiment]

Figure 6:
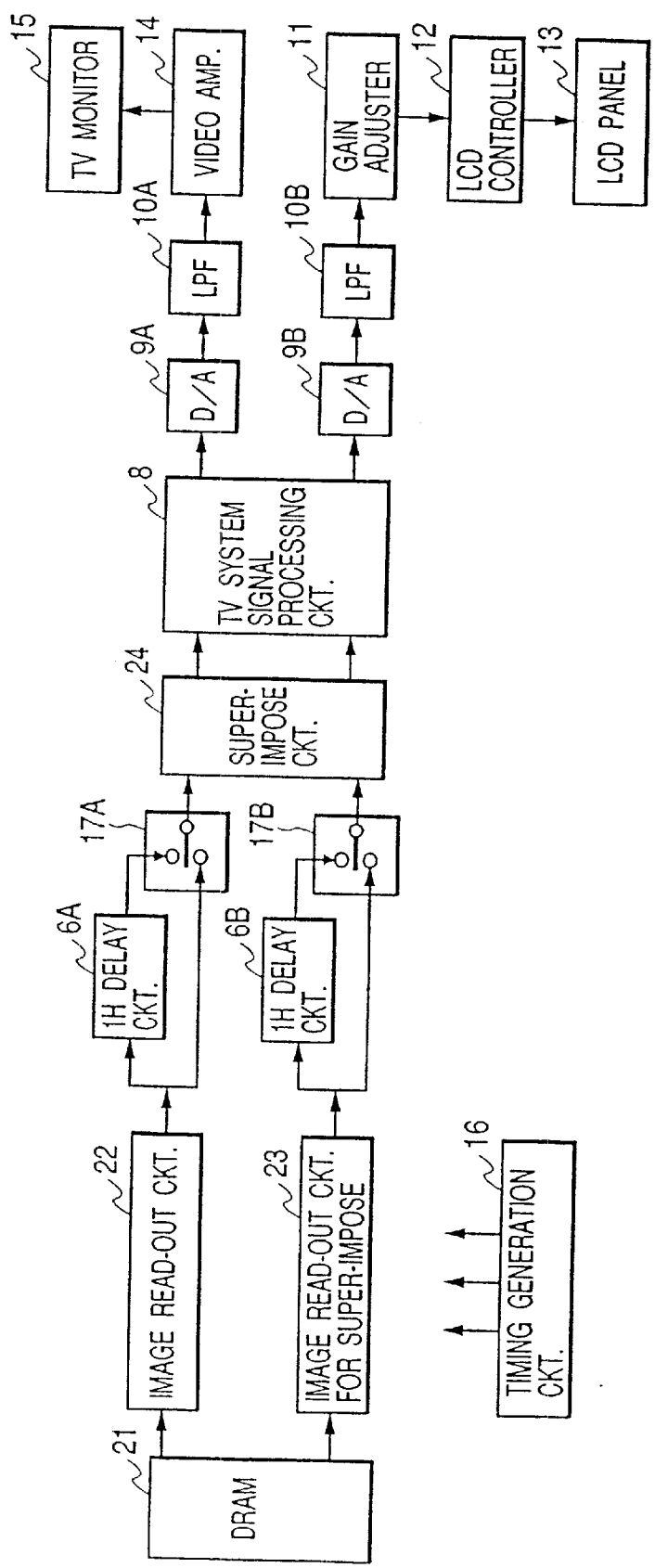
FIG. 6 is a block diagram showing a construction of a video signal processing apparatus according to the third embodiment.

FIG. 6 is a block diagram showing a construction of a video signal processing apparatus according to the third embodiment. The same component elements as those in the first and second embodiments mentioned above are designated by the same reference numerals and their descriptions are omitted here.

In the third embodiment, 1H delay circuits 6A and 6B of one horizontal line (H) and selectors 17A and 17B are provided at the post stages of the image read-out circuit 22 and image read-out circuit 23 for super-impose, respectively.

Although the line interpolation has been performed upon reading from the DRAM 21 in the second embodiment, the line interpolation is performed after the video data was read out from the DRAM 21 by using the 1H delay circuits 6A and 6B and selectors 17A and 17B in the third embodiment.

As mentioned above, not only the pre-interpolation but also a linear interpolation can be performed from the lines before and after the target line by the 1H delay circuits 6A and 6B. As compared with the second embodiment, a natural image can be displayed while suppressing an aliasing noise of a high frequency of the output image, namely, without a notch.

[Fourth embodiment]

Figure 7:
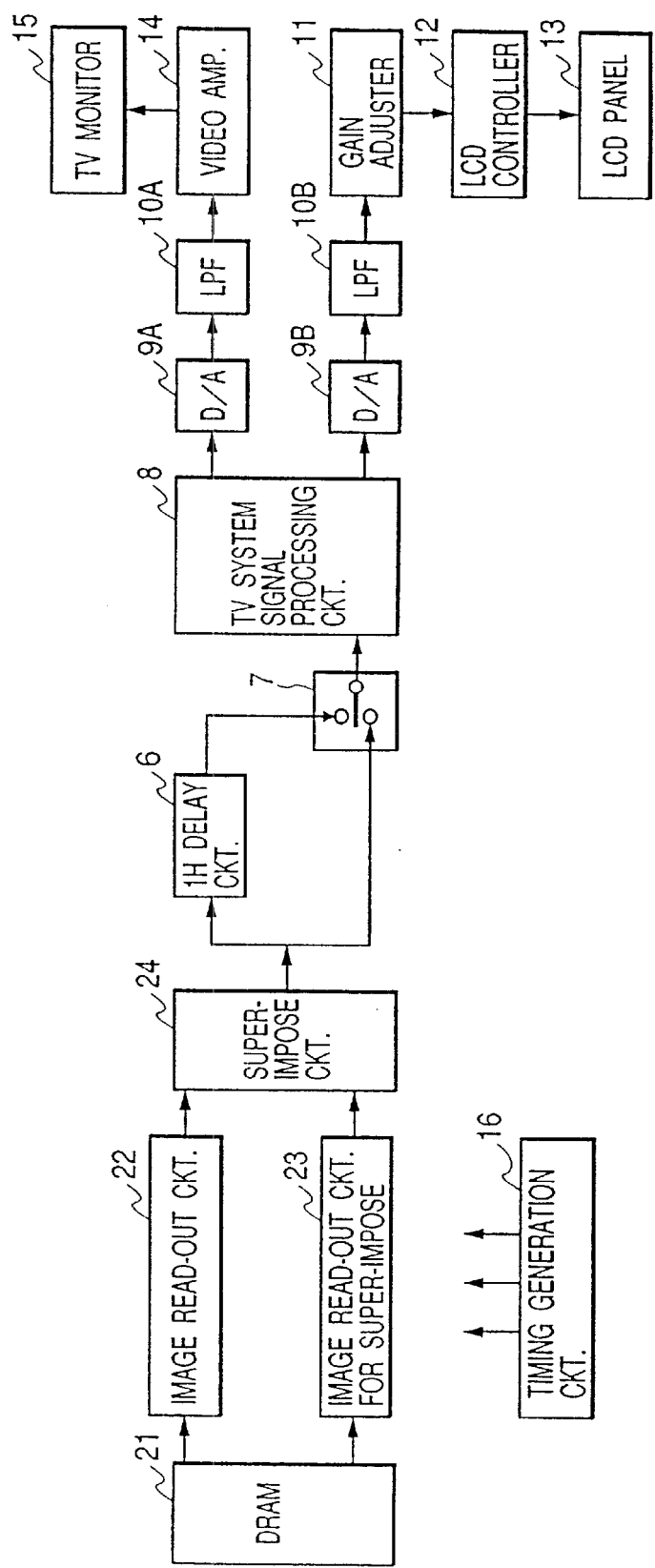
FIG. 7 is a block diagram showing a construction of a video signal processing apparatus according to the fourth embodiment.

FIG. 7 is a block diagram showing a construction of a video signal processing apparatus according to the fourth embodiment. The same component elements as those in the third embodiment mentioned above are designated by the same reference numerals and their descriptions are omitted here.

In the fourth embodiment, different from the third embodiment, the 1H delay circuit 6 of one system and the selecting circuit 17 of one system are used and are provided at the post stage of the super-imposing circuit 24. By always matching the display on the TV monitor 15 to the display on the LCD panel 13 by this circuit construction, the circuit scale can be reduced.

[Fifth embodiment]

The fifth embodiment relates to a case of a video signal processing apparatus of the high number of pixels in which the number of pixels of the CCD sensor 1 is larger than (752 (horizontal)×485 (vertical) pixels) or (752 (horizonal)×575 (vertical) pixels). The other construction of the video signal processing apparatus is substantially the same as that of the first embodiment.

In this case, an image reduction is performed upon data writing of the data writing circuit 4 or upon data reading of the data reading circuit 7. As a reducing method of the image, the data is thinned out by passing through an LPF. Consequently, a photographed image can be almost accurately displayed on the TV monitor 15 or LCD panel 13 by the arbitrary number of pixels of the CCD.

Even in the constructions of FIGS. 2 and 3, by using similar means, namely, by performing the image reduction upon data writing of the data writing circuit 4 or upon data reading of the data reading circuit 7 without limiting to the video signal processing apparatus of FIG. 1, the invention can cope with the CCD sensor having the large number of pixels.

[Sixth embodiment]

Figure 8:
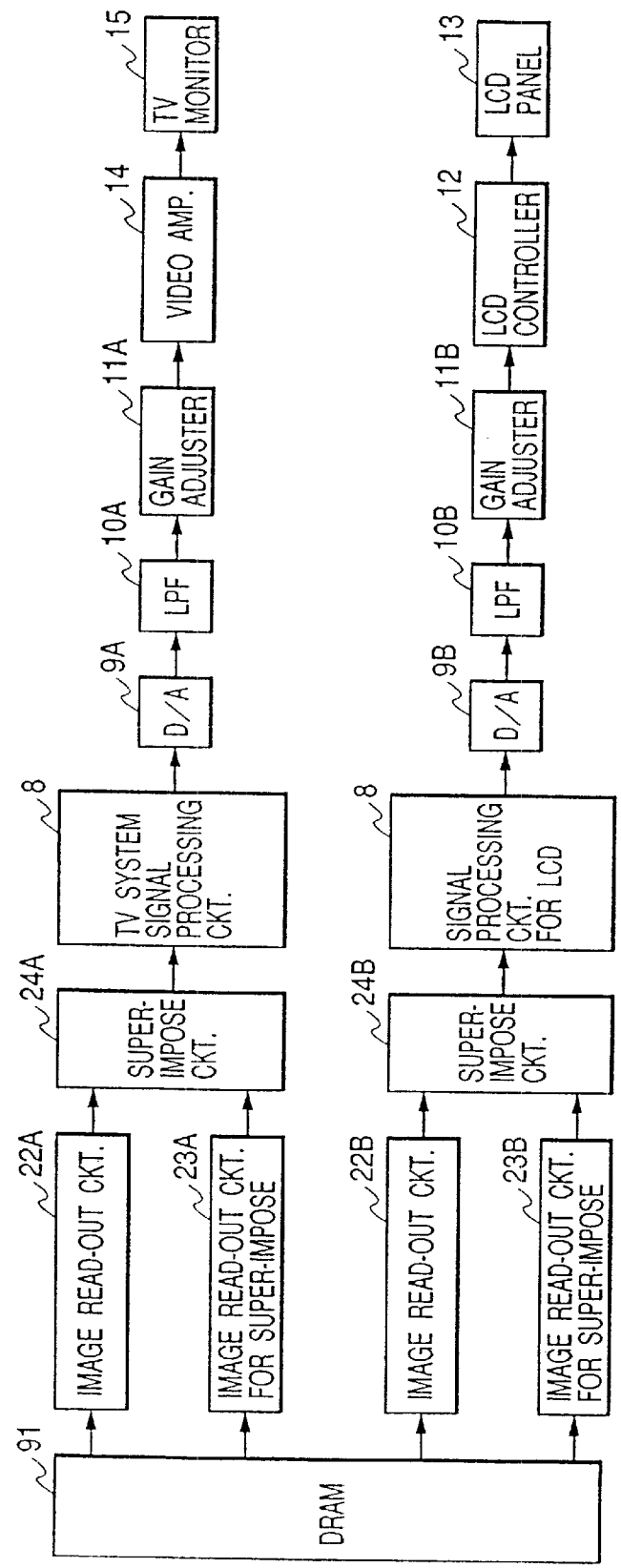
FIG. 8 is a block diagram showing a construction of a video signal processing apparatus according to the sixth embodiment.
Figure 9:
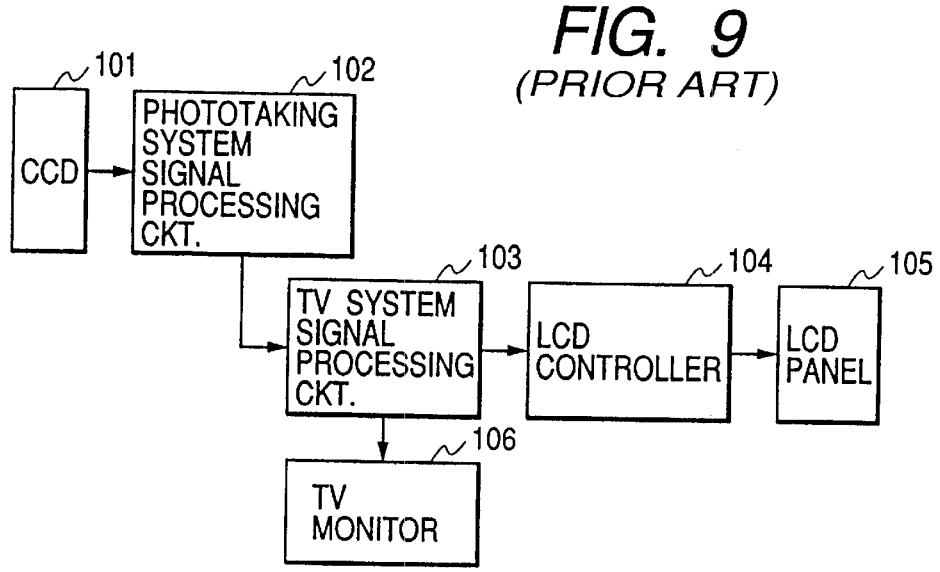
FIG. 9 is a block diagram showing a construction of a conventional video signal processing apparatus.
Figure 10A:
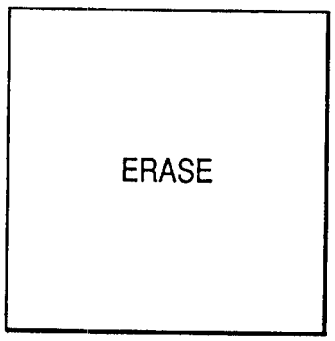
FIGS. 10A, 10B, 10C and 10D are diagrams showing an example of a display in which a part of a character has been deleted.
Figure 10B:
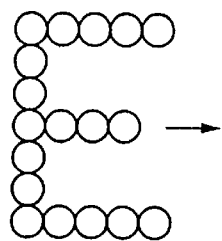
Figure 10C:
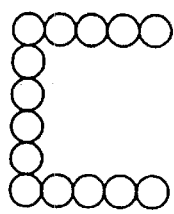
Figure 10D:
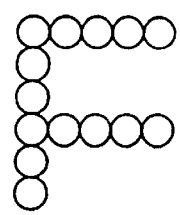

FIG. 8 is a block diagram showing a construction of a video signal processing apparatus according to the sixth embodiment. Since the video signal processing apparatus of the sixth embodiment fundamentally has the same circuit construction as that in the second embodiment, its detailed descriptions is omitted here.

In the sixth embodiment, each section is divided into two systems for the TV monitor display and the LCD display and is individually processed.

In the video signal processing apparatus, as for the liquid crystal display, it is possible to construct such that even if the data is thinned out in a manner similar to the second embodiment, the video image such as character information or the like for super-impose is not lost. On the other hand, in the display on the TV monitor, the information of 575 lines (vertical) can be displayed without thinning out the lines. Therefore, as for the video data for super-impose as well, the information of 575 lines (vertical) has been stored in a memory (DRAM 91).

Particularly, in case of displaying the information to only the TV monitor without performing the liquid crystal display, since the number of lines of the display screen is fairly larger than that of the LCD panel, finer information can be displayed. For example, a super-impose or the like can be performed in a small picture plane in the multi-screen mode.

According to the video signal processing apparatus of the embodiment, the video data is stored in the storage means, the stored video data is read out by the read-out means, the read-out video data is interpolated by the interpolating means, and when the interpolated video data is displayed by the display means, the data in the portion to be interpolated by the interpolating means is matched to the data in the portion that is not displayed by the display means by the interpolation control means. Therefore, the portion of the lines to be compensated from 485 lines (vertical) of the NTSC system to 575 lines (vertical) of the PAL system can be made coincide with the portion to be displayed in the liquid crystal display by thinning out the lines at a rate of 1 line per 7 lines. Even if the CCD sensor of the NTSC system is used at the time of the PAL system, the liquid crystal display can be performed without a deterioration of the picture quality.

According to the video signal processing apparatus of the embodiment, the storage means stores the video data comprising the photographed image data and the video data for super-impose, the reading means individually reads out the stored photographed image data and video data for super-impose, the interpolating means interpolates the photographed image data and the video data for super-impose which are individually read out, the display means displays the interpolated photographed image data and video data for super-impose onto the same picture plane, and the interpolation control means matches the photographed image data and video data for super-impose in the portions which are interpolated by the interpolating means to the data in the portion that is not displayed by the display means, respectively. Therefore, in the case where the character information or the like for user interface is super-imposed to a video image and the resultant image is displayed, the lines to be thinned out in the liquid crystal display can be compensated from the lines before and after the present line. When the lines of the PAL system are thinned out and a resultant image is displayed by the LCD, it can be correctly displayed without thinning out the character information.

Not only the pre-interpolation but also the linear interpolation can be performed from the lines before and after the present line. A natural image can be displayed while suppressing the aliasing noise of a high frequency of the output image, namely, without a notch.

Further, the circuit for super-imposing and the circuit to individually line-interpolate the photographed image and the video image for super-impose are separately provided as two systems for the TV monitor and the liquid crystal display and are independently controlled, so that the optimum image can be displayed in accordance with each of the LCD panel and the TV monitor.

According to the embodiments, when the video data is read out from the storage means, since the interpolating means interpolates the data, the circuits such as 1H delay circuit, selector, and the like can be omitted, so that the circuit construction can be simplified.

According to the embodiments, after the process to display the photographed image data and the video data for super-impose onto the same picture plane was performed, the interpolating means interpolates the data, so that a scale of the circuit to display the photographed image and the video image for super-impose onto the same picture plane can be reduced.

The present invention is not limited to the foregoing embodiments but many modifications and variations are possible within the spirit and scope of the appended claims of the invention.

What is claimed is:

1. A video signal processing apparatus comprising:

storage means for storing video data comprising photographed image data and video data for super-impose;

read-out means for individually reading out said stored photographed image data and video data for super-impose;

interpolating means for interpolating said photographed image data and the video data for super-impose which are individually read out;

display control means for displaying said interpolated photographed image data and video data for super-impose onto a same picture plane; and interpolation control means for controlling said interpolating means to match the photographed image data and the video data for super-impose in portions which are interpolated by said interpolating means to data in a portion which is not displayed by said display control means, respectively.

2. An apparatus according to claim 1, wherein when the video data is read out from said storage means, said interpolating means interpolates the data.

3. An apparatus according to claim 1, wherein after a process to display said photographed image data and said video data for super-impose onto the same picture plane was performed, said interpolating means interpolates the data.

* * * * *

UNITED STATES PATENT AND TRADEMARK OFFICE
CERTIFICATE OF CORRECTION

PATENT NO. : 6,480,230 B1
DATED : November 12, 2002
INVENTOR(S) : Honma

It is certified that error appears in the above-identified patent and that said Letters Patent is hereby corrected as shown below:

<u>Column 1,</u>
Line 50, "cam coder," should read -- camcorder, --.

<u>Column 3,</u>
Line 52, "signal," should read -- signal; --; and
Line 53, "charts-showing" should read -- charts showing --.

<u>Column 4,</u>
Line 37, "(DRAM) and" should read -- (DRAM), and --.

<u>Column 5,</u>
Line 66, "cam coder," should read -- camcorder --.

<u>Column 6,</u>
Line 7, "costs," should read -- costs. --.

<u>Column 7,</u>
Line 11, "RD," should read -- HD, --; and
Line 45, "likes" should read -- like, --.

<u>Column 9,</u>
Line 14, "(VI)" should read -- (UI) --.

<u>Column 10,</u>
Line 58, "made coincide" should read -- made to coincide --.

Signed and Sealed this

Twenty-eighth Day of October, 2003

JAMES E. ROGAN
*Director of the United States Patent and Trademark Office*